US006682141B2

United States Patent
Reynolds et al.

(10) Patent No.: US 6,682,141 B2
(45) Date of Patent: Jan. 27, 2004

(54) SEAT ASSEMBLY HAVING A SEAT REPOSITIONING DEVICE AND AN ASSOCIATED METHOD

(75) Inventors: Thomas Leroy Reynolds, Bainbridge Island, WA (US); Brian D. Coughren, Kent, WA (US)

(73) Assignee: The Boeing Company, Seattle, WA (US)

( * ) Notice: Subject to any disclaimer, the term of this patent is extended or adjusted under 35 U.S.C. 154(b) by 25 days.

(21) Appl. No.: 09/953,386

(22) Filed: Sep. 14, 2001

(65) Prior Publication Data

US 2003/0052519 A1 Mar. 20, 2003

(51) Int. Cl.[7] ................................................. B60N 2/42
(52) U.S. Cl. ..................... 297/216.1; 297/480; 296/68.1
(58) Field of Search ........................ 297/216.1, 284.11, 297/480; 296/68.1

(56) References Cited

U.S. PATENT DOCUMENTS

| | | | |
|---|---|---|---|
| 2,789,650 A | | 4/1957 | Krous |
| 2,970,862 A | | 2/1961 | Racine |
| 3,858,930 A | | 1/1975 | Calandra et al. |
| 5,022,707 A | | 6/1991 | Beauvais et al. |
| 5,244,252 A | | 9/1993 | Serber |
| 5,366,269 A | | 11/1994 | Beauvais |
| 5,695,242 A | * | 12/1997 | Brantman et al. ... 297/216.1 X |
| 6,050,635 A | * | 4/2000 | Pajon et al. ......... 297/216.1 X |
| 6,296,292 B1 | * | 10/2001 | Feldman .................... 296/68.1 |
| 6,402,245 B1 | * | 6/2002 | Newton et al. ..... 297/284.11 X |

FOREIGN PATENT DOCUMENTS

| | | |
|---|---|---|
| BE | 537159 | 6/1951 |
| DE | 1 163 168 | 4/1958 |

* cited by examiner

*Primary Examiner*—Anthony D. Barfield
(74) *Attorney, Agent, or Firm*—Alston & Bird LLP

(57) ABSTRACT

The present invention provides a seat assembly supported by a seat frame that includes a seat cushion, an upwardly extending back cushion, a seat repositioning device, and an actuation mechanism that repositions the seat cushion. In one embodiment, an airbag is disposed beneath a seatpan such that inflation raises a forward portion of both the seatpan and seat cushion. Inflation of the airbag is in response to a sensor detecting the rapid deceleration of the vehicle. The seatpan is attached to each respective armrest of the seat frame at a hinge point that permits the seatpan to rotate upwardly. A seatbelt cinching mechanism is attached to the seatpan such that upward rotation of the seatpan pulls the cinching mechanism around an idler pulley, and thereby increases seatbelt tension. In a second embodiment, an airbag inflates through an opening in the seat cushion and above a forward portion of the seat cushion. In a third embodiment, the airbag is substituted with a gas activated cylinder. As in the first embodiment, rapid deceleration initiates the gas activated cylinder to lift the seatpan upwardly.

14 Claims, 9 Drawing Sheets

SEAT ASSEMBLY HAVING A SEAT REPOSITIONING DEVICE AND AN ASSOCIATED METHOD

FIELD OF THE INVENTION

The present invention relates generally to seat assemblies having airbags or gas activated cylinders and, more particularly, to seat assemblies having airbags or gas activated cylinders positioned to raise the knees of an occupant upwardly to limit the forward motion of the occupant in the event of rapid deceleration.

BACKGROUND OF THE INVENTION

In today's fast paced world of rapid transportation, the forces exerted on the human body during a vehicular crash can result in severe injuries. Of significant concern are head injuries sustained as a result of the rapid deceleration of a vehicle, such as an aircraft, an automobile or the like. When a vehicle rapidly decelerates the occupant is accelerated forward; this may result in the occupant striking his/her head on some object within the vehicle that is positioned in front of the occupant. As a result, safety measures designed to protect a vehicle's occupants have been the focus of both government regulation and industry research.

Over the years, numerous systems have been developed to limit trauma to the head that may result during a crash or other rapid deceleration. Among these systems are seat belts, airbags, and articulating seats. Seat belts are one of the most common devices used to restrain the occupant's forward acceleration. The seat belt functions by restraining the forward movement of the occupant, thereby preventing an impact between the occupant's head and upper torso and objects within the vehicle that are forward of the occupant. In particular, scientific crash tests have conclusively demonstrated the importance of increasing seat belt tension to restrain an occupant's movement. Airbags, which inflate during a collision, provide a layer of protection between the occupant's head and upper torso and objects within the vehicle that are forward of the occupant.

Articulating seats use the forward inertia of the seated occupant to rotate the seat forward and upward during rapid deceleration causing some of the forward energy to be redirected to upward and rotational energy. By redirecting the forward acceleration energy, articulating seats reduce the energy that accelerates the occupant forward. For example, U.S. Pat. No. 5,022,077 issued to Beauvais et al. describes an articulating seat that uses the inertial energy of the seat and occupant to rotate the seat upwardly. It discloses several embodiments of articulating seats that use several different forms of brackets that allow the seat to rotate forward and up in response to rapid deceleration of a vehicle. A further example of an articulating seat is described in U.S. Pat. No. 2,789,650 issued to Krous. Krous's articulating seat uses hydraulic pressure to rotate the seat upwardly. The hydraulic system is initiated automatically upon front impact of the vehicle or through sustained or violent brake application. The current state of the art, including the aforementioned patents, are designed to respond to the rapid deceleration of an automobile and have not been adapted to address the unique conditions of rapid deceleration that may occur within a commercial transport aircraft.

Of significant concern are head injuries sustained during the rapid deceleration of an airplane. To address this concern, the Federal Aviation Administration issued 14 C.F.R. § 25.562. Effective Jun. 16, 1988, the regulation requires that all new commercial transport aircraft be equipped with 16 g dynamically qualified seats. FAR 25.652 specifies Head Injury Criteria (HIC) that a passenger may incur under certain rapid deceleration conditions. Specifically, FAR 25.562 requires that during a 16 g rapid deceleration a passenger may not sustain a head injury that exceeds 1000 units, as defined according to a mathematical equation. A problem that arises in instances of rapid deceleration involving commercial transport aircraft is that in the interior configuration of aircraft, passengers are frequently located behind bulkheads such as galleys, lavatories, closets, and the like. These bulkheads are fixed structures and will be unlikely to move, even in the event of rapid deceleration. Seats are often located in such close proximity to a bulkhead that during instances involving rapid deceleration as specified in FAR 25.562 the occupant could be thrown into a bulkhead, and possibly surpass the HIC requirement.

Thus, a need exists to create a system that protects a seated occupant from head trauma that can result from an occupant impacting his/her head on an object within the vehicle that is forward of the occupant upon rapid deceleration. Of particular interest, is the protection of occupants seated behind bulkheads on commercial transport aircraft.

SUMMARY OF THE INVENTION

The present invention provides an effective means of protecting a vehicular occupant in the event of rapid deceleration from being thrown forward into an object within the vehicle that is forward of the occupant. Airbag systems designed for use in automobiles require too large a footprint to be feasible in commercial transport aircraft. Seatbelts require the use of a shoulder harness to restrain the forward motion of an occupant's upper torso and head. Articulating seats that depend upon directional inertia to function may require a certain mass before they will effectively protect an occupant. In particular, inertial driven articulating seats may not function onboard an aircraft if the aircraft is in an abnormal position, such as a side-ways skid, collapse of a landing gear, or similar situations. In contrast, the present invention provides a seat assembly specifically adapted to the unique safety concerns that are present in commercial transport aircraft.

In one embodiment of the invention the seat assembly comprises a seat cushion, a seatback extending upwardly, an air bag, and an actuation mechanism that inflates the air bag in response to a predetermined event. The airbag is located below the seat cushion and towards the front of the seat cushion, so that when the air bag is inflated it lifts the front portion of the seat cushion upwardly. Inflation of the airbag can be initiated by sensors detecting the rapid deceleration of the vehicle.

The seat assembly preferably comprises a seatpan upon which the seat cushion rests. Preferably, the seatpan is connected to the armrest at a hinge point near the rear of the seat cushion. As the airbag is inflated the seat pan is lifted upwardly near its front portion. This action lifts the front portion of the seat cushion thereby raising the occupant's knees from beneath the legs. The action of raising the occupant's legs towards his/her upper torso restrains the forward movement of the upper torso, and prevents an impact between the occupant's head and objects within the vehicle that are forward of the occupant.

In the preferred embodiment of the invention the seatbelt is attached to the rear of the seatpan. Consequently, when the front portion of the seatpan is raised upwardly in response to inflation of the airbag, seatbelt tension is increased. The additional seatbelt tension helps to restrain the forward movement of the occupant's torso.

The seat frame preferably includes a front lateral tube that supports the seat assembly. The front lateral tube is located beneath the front portion of the seatpan and connects the left side of the seat frame to the right. The front lateral tube can be hollow to allow the placement of the actuation mechanism that inflates the airbag. The limited amount of available space is a special concern in commercial transport aircraft and the placement of the actuation mechanism within the seat frame allows for the more efficient use of this space.

In a second embodiment of the invention the airbag inflates through the surface of the seat cushion by way of a narrow opening formed within the seat cushion. The inflation of the airbag occurs directly beneath the occupant's legs and results in the legs being raised towards the chest.

In a third embodiment of the invention, the seat assembly includes a gas activated cylinder instead of an airbag. The gas activated cylinder is attached to the underside of the seatpan and may be secured to a rear leg of the seat frame. In response to a rapid deceleration of the vehicle, the gas activated cylinder goes from a nominal or at rest state to an extended state. In the extended state the seatpan and seat cushion are pushed upwardly thereby tightening seat belt tension and raising the occupant's legs towards the chest.

The prior art of safety restraint does not adequately address the safety concerns in commercial transport aircraft. The present invention is uniquely adapted to reduce the likelihood of contact between an occupant of an airline seat and a bulkhead that is forward of the occupant.

BRIEF DESCRIPTION OF THE DRAWINGS

Figure 1:
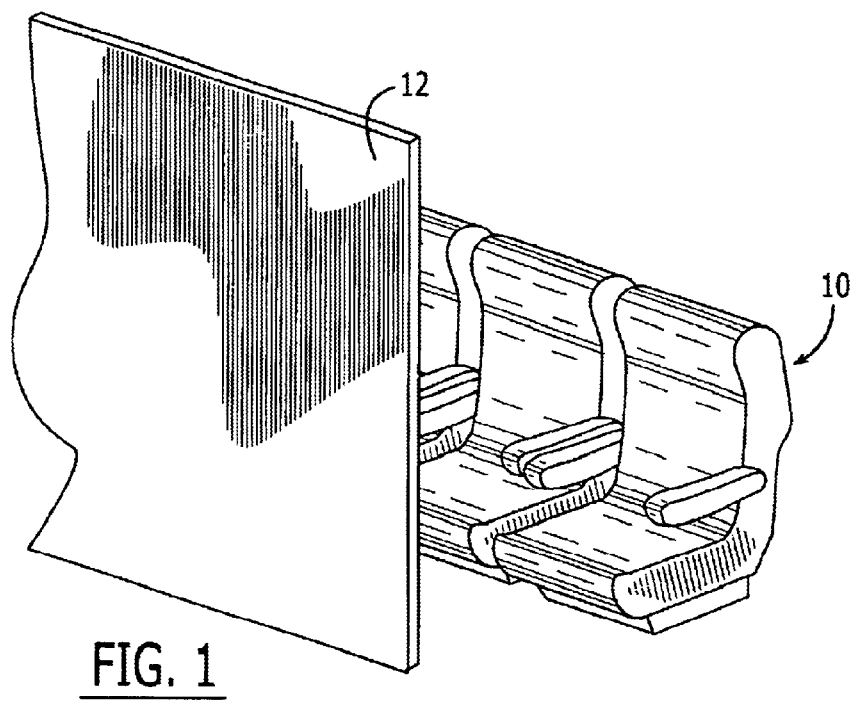
Figure 2:
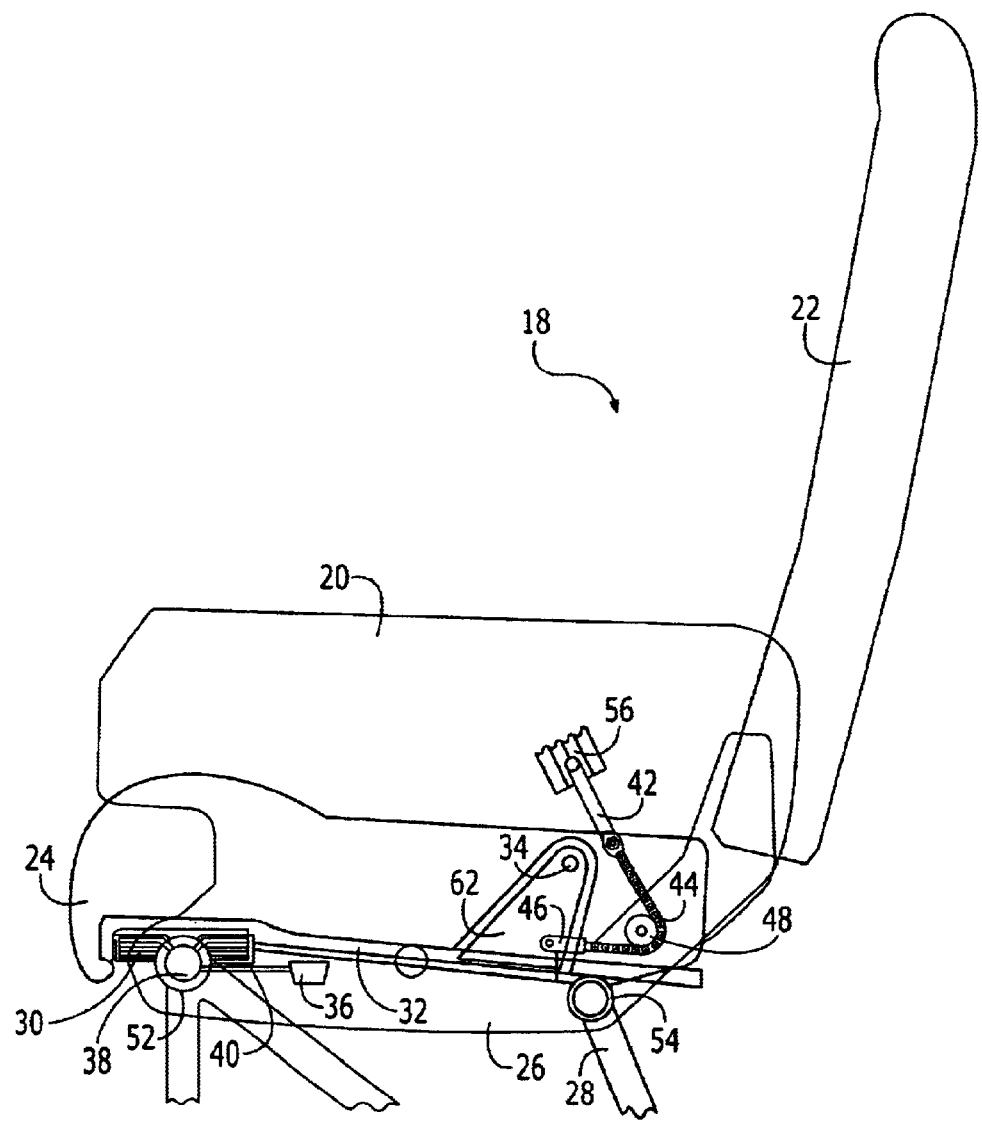
Figure 3:
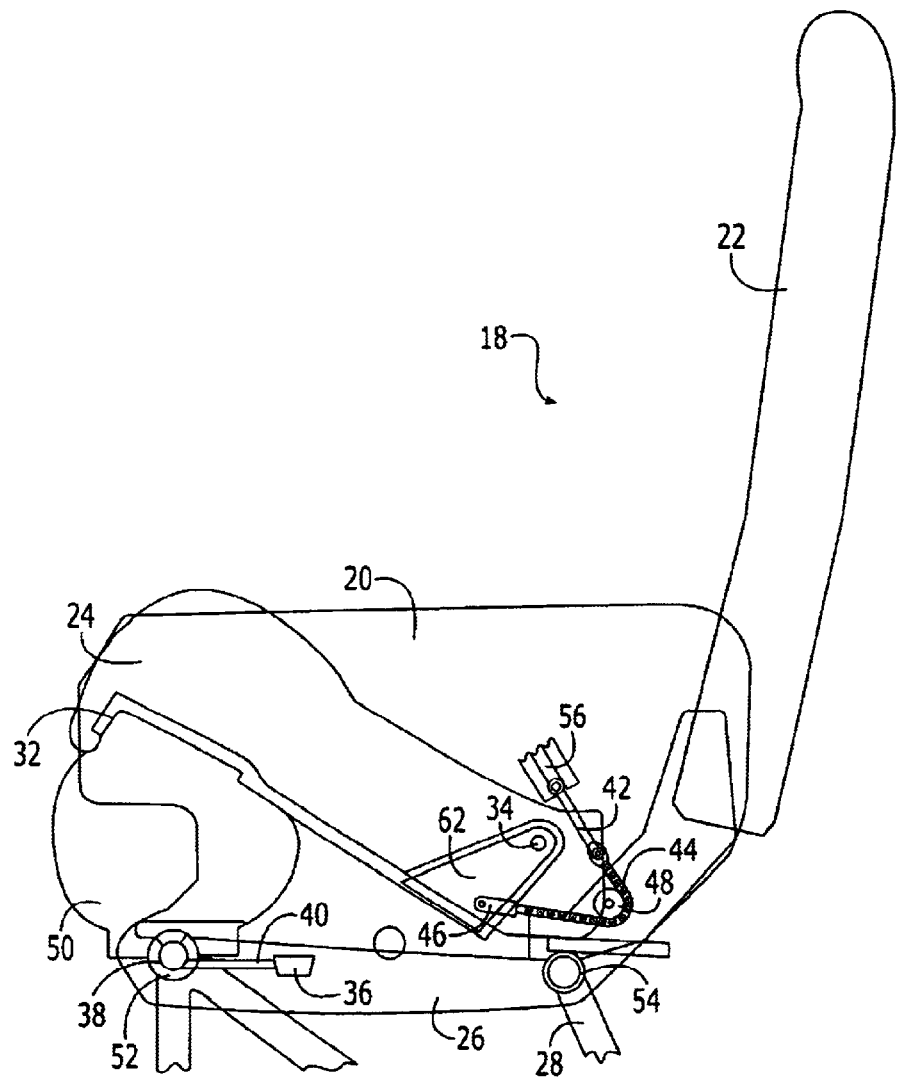
Figure 4:
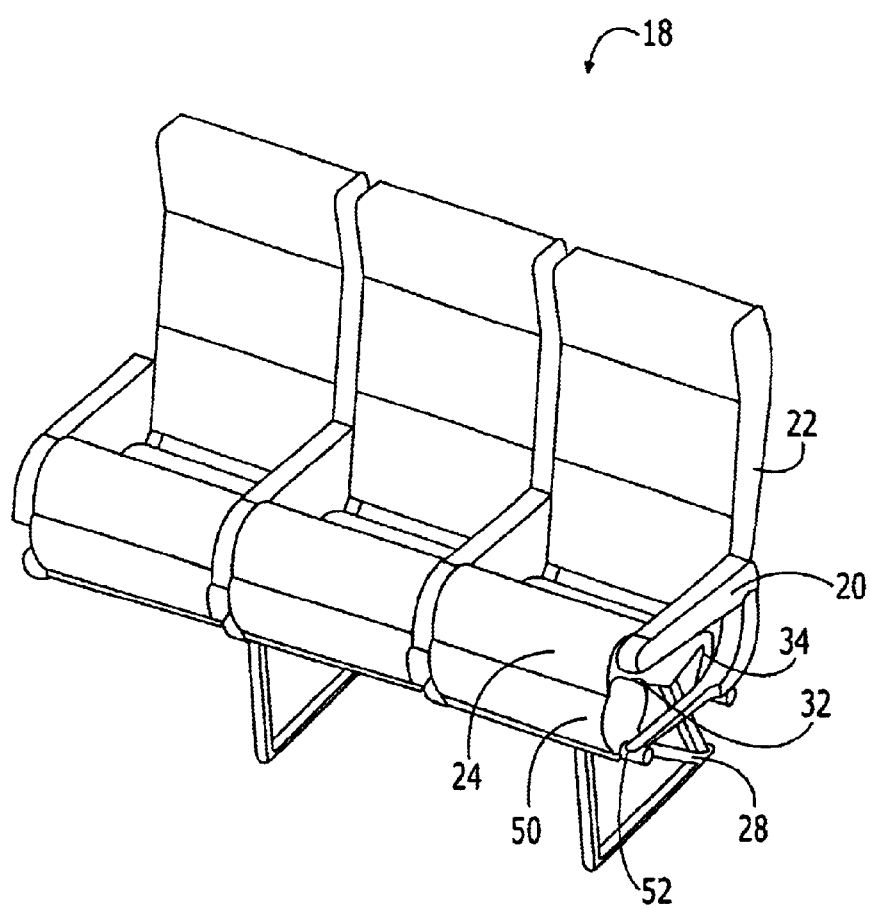
Figure 5:
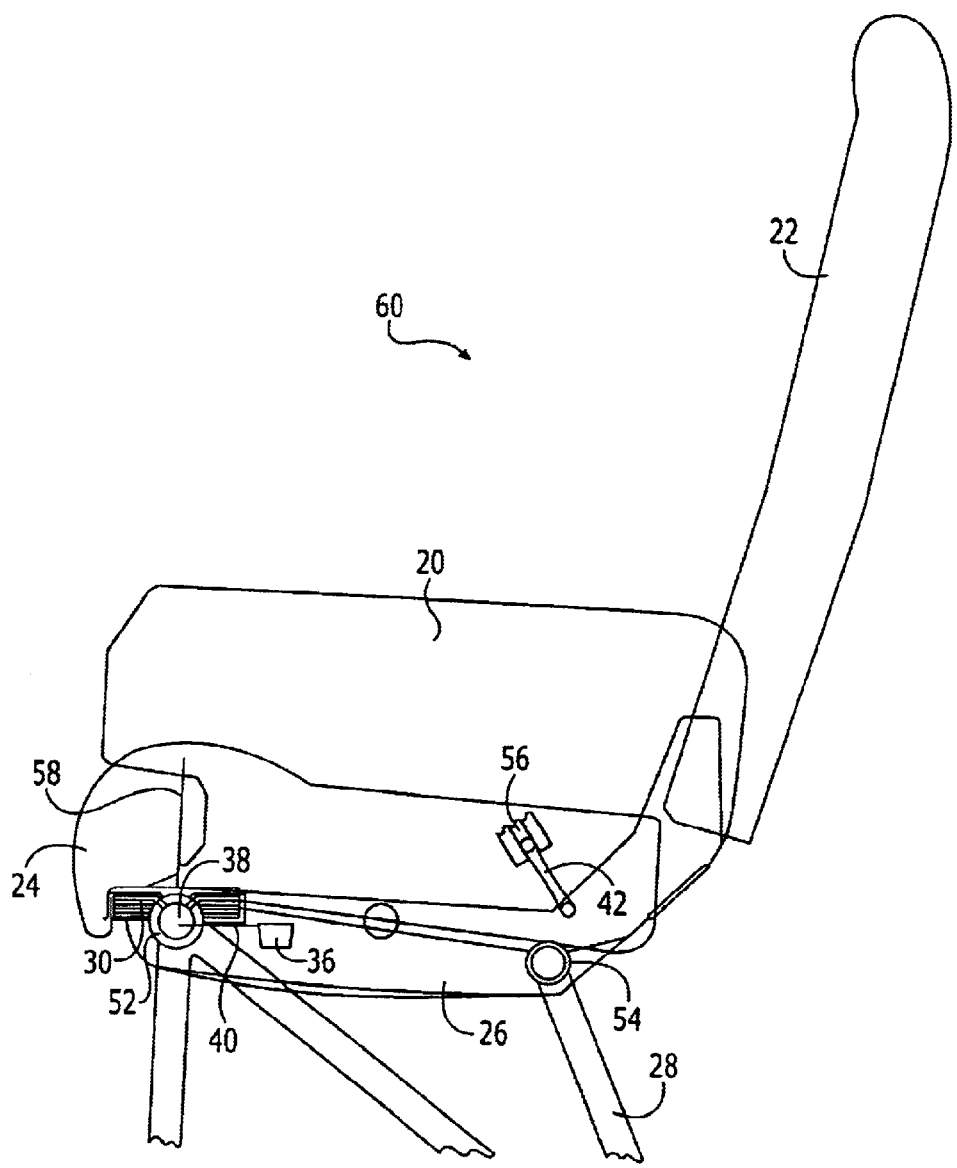
Figure 6:
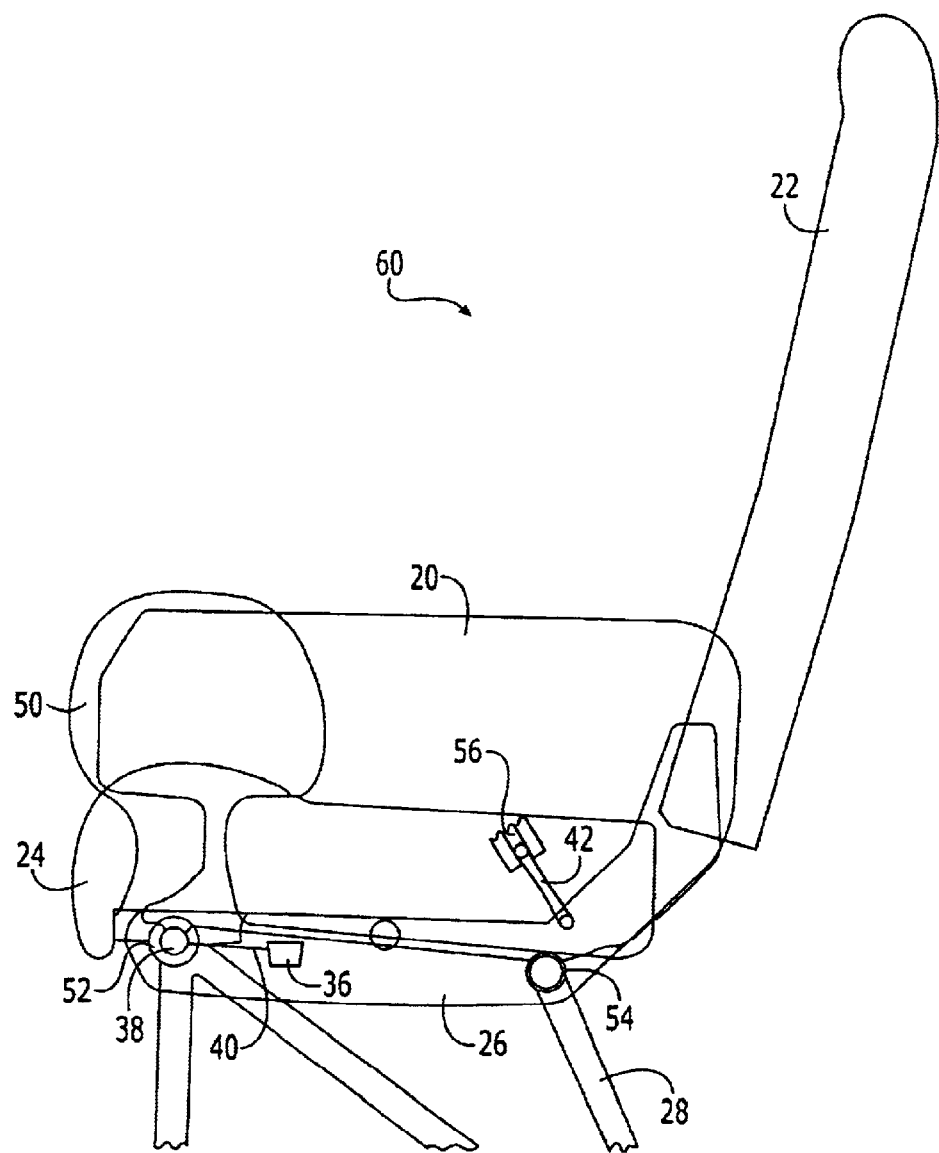
Figure 7:
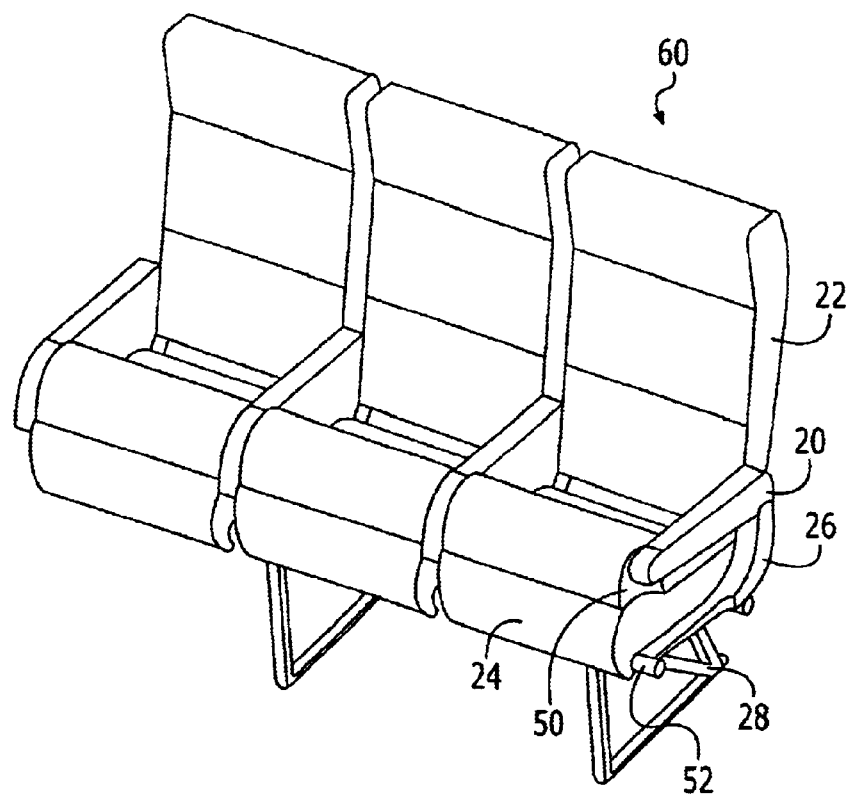
Figure 8:
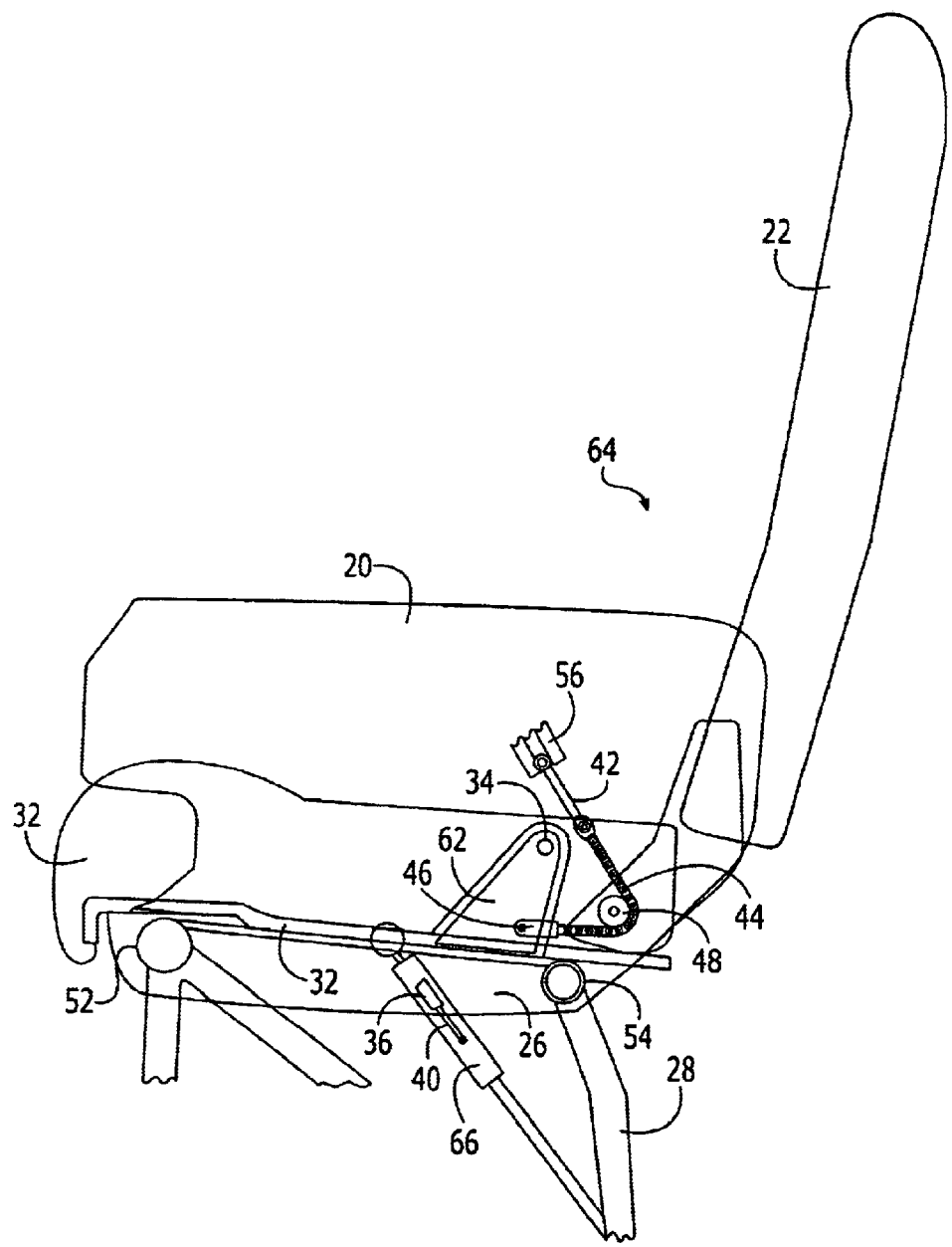
Figure 9:
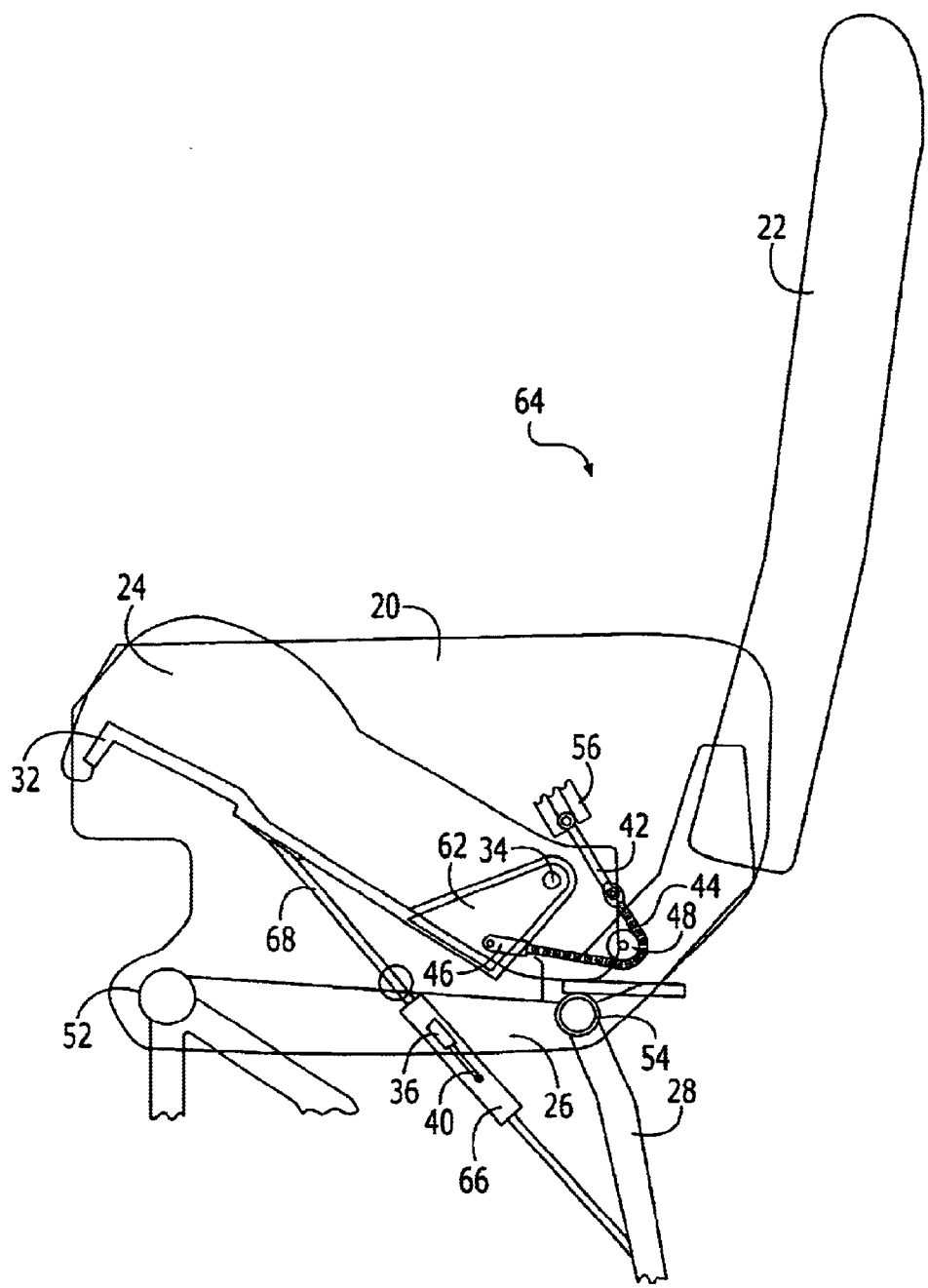

Having thus described the invention in general terms, reference will now be made to the accompanying drawings, which are not necessarily drawn to scale, and wherein:

FIG. 1 is a figurative illustration of a row of seat assemblies positioned behind a bulkhead;

FIG. 2 is a side elevational view of one of the embodiments of the present invention showing the seat assembly with the airbag in a folded, unexpanded state located beneath the seat assembly's seatpan and seat cushion;

FIG. 3 is a side elevational view of the seat assembly of FIG. 1 with the airbag in its inflated state;

FIG. 4 is a side elevational view of a row of seat assemblies of FIG. 1 with airbags in an inflated state in which a lower section of the armrest has been removed to illustrate the side of the airbag;

FIG. 5 is a side elevational view of a second embodiment of the present invention showing the seat assembly with the airbag in an unexpanded state;

FIG. 6 is a side elevational view of the seat assembly of FIG. 5 with the airbag in an inflated state;

FIG. 7 is a figurative view of a row of seat assemblies of FIG. 5 with airbags in an inflated state;

FIG. 8 is a side elevational view of the third embodiment of the present invention showing a seat assembly having a gas activated cylinder in a nominal or at rest state; and FIG. 9 is a side elevational view of the seat assembly of FIG. 8 with the gas activated cylinder in an extended state.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

According to the present invention, a seat assembly having a seat repositioning device, such as an airbag or gas activated cylinder, for reducing the forward motion of an occupant in response to rapid deceleration is provided. The seat assembly can be deployed in a wide variety of applications, including in automobiles or the like. One particularly advantageous application of the seat assembly is onboard aircraft. As shown in FIG. 1, for example, the row of seat assemblies 10 positioned immediately rearward of a bulkhead or other fixed structure 12 may have airbags in accordance with the present invention to reduce the likelihood that the occupants of the seat assemblies will be thrown forwardly to such an extent so as to strike their heads on the bulkhead.

The seat assemblies of the present invention may be embodied in several different manners. For purposes of illustration, but not of limitation a first embodiment of the invention is illustrated in FIGS. 2, 3, and 4. With reference to FIGS. 2 and 3 a seat assembly that illustrates one embodiment of the invention is broadly designated by reference number 18. FIGS. 5 and 6 illustrate a second embodiment of the invention that is broadly designated by reference number 60. FIGS. 8 and 9 illustrate a third embodiment of the invention that is broadly designated by reference number 64. In all embodiments, the seat assembly 18, 60, and 64 typically includes a seat back 22; an armrest 20; a seat repositioning device that is typically an airbag 30 or a gas activated cylinder 66; a seat cushion 24; and an actuation mechanism 38 that are supported by a seat frame 26.

The seat frame 26 is supported by a plurality of seat legs 28 that are interconnected and attached by tubes or other cross members 52, 54 that run laterally beneath the seat frame 26. Typically, the seat frame 26, seat legs 28, and lateral tubes 52, 54 are constructed of metallic material, although these components may be constructed of other materials, if desired. The base of the seat legs 28 is usually fastened within tracks that run along the floor of the aircraft. The tracks allow the easy removal and/or positioning of the seat assembly within the aircraft. However, the base of the legs may be fastened to the floor of the aircraft in other manners.

The airbag 30 is inflated by an actuation mechanism 38. Typically, the airbag 30 is constructed of nylon, but other materials may be substituted so long as the airbag is capable of transforming from an unexpanded, collapsed state to an inflated state. The actuation mechanism 38 can be located within or upon the front lateral support tube 52 proximate the airbag 30. However, placement of the actuation mechanism 38 is not limited to the front lateral tube 52, and can be varied depending upon design preference. Typically, the actuation mechanism 38 consists of a small capsule of sodium azide powder, which instantly turns into inert nitrogen gas in response to stimulation, thereby inflating the airbag 30. The reaction of the sodium azide powder is generally initiated when a sensor 36 sends an electrical shock to the actuation mechanism 38. However, inflation of the airbag 30 is not limited to the use of sodium azide powder and may be accomplished through the substitution of various methods for rapidly inflating the airbag including the gaseous product of other chemical reactions or a compressed gas typically stored in a cylinder or the like.

Typically, the airbag 30 is inflated by the actuation mechanism 38 in response to a sensor 36 detecting the rapid deceleration of the vehicle, after which the sensor 36 sends a signal via a connection 40, such as an electrical wire, to the actuation mechanism 38. As such, an exemplary sensor for detecting rapid deceleration is an accelerometer sensor. However, the sensor 36 is not limited to the detection of rapid deceleration, and other methods of initiating the actuation mechanism 38 can be used depending upon the conditions under which the airbag 30 is to be inflated. Typically, the sensor 36 is electrically powered by means of the aircraft's electrical system, a battery pack, or a piezoelectric source. However, the sensor 36 is not limited to the use of an electrical power source and other methods of powering the sensor may be employed, so long as the sensor is capable of detecting the onset of rapid deceleration and generating a signal that actuates the actuation mechanism. As indicated by FIGS. 2, 3, 5, and 6, the sensor 36 can be located on the seat frame 26. However, the sensor 36 can be located on a seat leg 28, on the floor below the seat assembly, or anywhere the designer designates as an appropriate location. Alternatively, inflation of the airbags 30 of all or a number of seat assemblies can be activated from a single crash sensor system.

In one embodiment of the invention, as indicated by FIGS. 2 and 3, the seat cushion 24 rests on the top of a seatpan 32. The seatpan 32 is typically supported by the seat frame 26 and the front lateral tube 52. Typically, the seatpan 32 is constructed of a rigid material, such as either plastic or metal. As is illustrated in FIGS. 2 and 3, the seatpan 32 may consist of a rigid base and a pair of upwardly extending members 62 attached to the opposed lateral sides of the rigid base proximate the rear of the seatpan 32. In the illustrated embodiment, for example, the upwardly extending members 62 are triangular in shape, although the upwardly extending members 62 may have other shapes. The seat cushion 24 is located on the seat pan 32 between the upwardly extending members 62. In addition, each upwardly extending member 62 of the seatpan 32 is connected to a respective armrest 20 at a hinge point 34. The hinge point 34 can consist of a pin that extends at least partially through both the upwardly extending member 62 of the seatpan 32 and the respective armrest 20 so as to permit rotation of the seatpan 32 and the seat cushion 24 carried thereby relative to the armrest 20, seat frame 26 and other fixed components of the seat assembly. However, the rotatable connection of the seatpan 32 to the seat assembly is not limited to the use of the upwardly extending member 62 and a pin and may be accomplished in any manner that is appropriate.

With reference to FIGS. 2 and 3, a seatbelt 56 is also connected to the seatpan 32. Although the seatbelt 56 may be attached to the seatpan 32 in various fashions, the seatbelt 56, of the illustrated embodiment, is attached to a forward belt attachment 42, which in turn is attached to a linkage cable 44 that runs over an idler pulley 48 to a seat pan connector 46 that is attached to the upwardly extending member 62 of the seatpan 32 below the hinge point 34. As illustrated in FIGS. 2 and 3, the idler pulley 48 is attached to the seat frame 26. Although only one end of the seatbelt 56 is depicted in FIGS. 2 and 3, both ends of the seatbelt 56 are preferably attached to the respective upwardly extending member 62 of the seatpan 32 in the same manner. The seat assembly may include a tension limiter that is attached to the seat belt cinching mechanism to limit the tensioning forces felt by a restrained occupant.

In the nominal or rest position, as illustrated in FIG. 2, the airbag 30 is folded in an unexpanded state. In this regard, the airbag 30 is located beneath a forward portion of the seat cushion 24 and the seatpan 32 and, in the illustrated embodiment above the front lateral tube 52 in the unexpanded state. When the sensor 36 detects the onset of rapid deceleration, a signal is sent from the sensor 36 to the actuation mechanism 38. The signal initiates the actuation mechanism 38 to release nitrogen gas into the airbag 30, which inflates the airbag 50. As illustrated in FIGS. 3 and 4, when the airbag 50 is in an inflated state, the front portion of the seatpan 32 is rotated upwardly about the hinge point 34. As a result, the legs of a seated occupant are lifted towards his/her upper torso, thereby restraining the forward motion of the occupant's upper torso and head. Thus, the occupant will be less likely to contact the bulkhead or other structure located forward of the occupant. Although not necessary to the practice of the present invention, in one embodiment in which the seatbelt 56 is connected to the seatpan 32 via a linkage 44 wrapping about an idler pulley 48, the seatbelt 56 is tightened about the occupant as the front portion of the seatpan 32 is lifted upwardly. In this embodiment, depicted in FIGS. 2 and 3, the rotation of the seatpan 32 pulls the linkage 44 about the idler pulley 48 such that the seatbelt 56 is drawn downwardly toward the idler pulley 48.

In a second embodiment of the invention as shown in FIGS. 5 and 6, the airbag 30 does not inflate beneath the seat cushion 24, but instead, inflates through an opening 58 preformed in the seat cushion 24. As will be apparent, however, many of the components in the second embodiment 60 of the seat assembly are the same as in the first embodiment 18 and will not be re-described. As shown in FIG. 5, the airbag 30 is generally disposed beneath the seat cushion 24 while in an unexpanded state. However, the airbag 30 may be disposed beneath a forward portion of a seat pan or the seat frame such that upon inflation of the airbag 30, the airbag 30 inflates through an opening 58 preformed in the seat cushion 24 that is defined by the seatpan or seat frame 26.

Upon detection of rapid deceleration or another predetermined event the airbag 30 inflates as shown in FIG. 6 through the opening 58 preformed in the seat cushion 24, and then above the seat cushion 24. Since a seatpan does not rotate upwardly in the embodiment depicted in FIGS. 5 and 6, the seatbelt 56 need not be connected to the seatpan via a linkage extending about an idler pulley. Instead, with reference to FIGS. 5 and 6, the seatbelt 56 is connected to a belt attachment 42 that may be attached directly to the seat frame 26.

With reference to FIGS. 6 and 7, inflation of the airbag 50 above the seat cushion 24 causes the occupant's legs to be raised toward his/her chest. As in the first embodiment, the raising of the occupant's legs towards the chest restrains the forward movement of the occupant's upper torso and head, thereby preventing the impact of the occupant's head with objects in the vehicle that are forward of the occupant, such as the bulkheads 12 shown in FIG. 1.

In a third embodiment of the invention as illustrated in FIGS. 8 and 9, a gas activated cylinder 66 serves as the seat repositioning device so as to raise the seatpan 32 and seat cushion 24 upwardly. As will be apparent, however, many of the components in the third embodiment 64 of the seat assembly are the same as in the first embodiment 18 and will not be re-described.

With reference to FIGS. 8 and 9, one end of the gas activated cylinder 66 is attached to the underside of the seatpan 32, and the other end is attached to a fixed portion of the seat assembly, such as a lower portion of the rear seat leg 28. FIG. 8 illustrates the gas activated cylinder 66 in the nominal or rest position. In the extended position, as illustrated in FIG. 9, a lift rod 68 extends upwardly out of the gas activated cylinder 66, thereby lifting the seatpan 32 upwardly. Typically, as in the first and second embodiment, the actuation mechanism is a solid chemical gas generator, such as sodium azide powder. In response to rapid deceleration, nitrogen gas is produced by the reaction of sodium azide powder that is located within the gas activated cylinder 66. Production of nitrogen gas within the gas activated cylinder 66 extends the lift rod 68 upwardly out of the gas activated cylinder 66, and as result, the seatpan 32 is lifted upwardly. However, extension of the lift rod 68 is not limited to the use of sodium azide powder and may be accomplished through the substitution of various methods for rapidly extending the lift rod including the gaseous product of other chemical reactions or a compressed gas typically stored in a cylinder or the like. Typically, the actuation mechanism is located within the gas activated cylinder. However, the actuation mechanism can be located outside the gas activated cylinder or anywhere else that is deemed appropriate, so long as the gas activated cylinder is capable of extending the lift rod rapidly in response to rapid deceleration.

With reference to FIGS. 8 and 9, the sensor 36 and connection 40 are illustrated as being located on the gas operated cylinder 66. However, as in the first and second embodiment the sensor 36 can be located on the seat frame 26, a seat leg 28, on the floor below the seat assembly, or anywhere the designer designates as an appropriate location.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A seat assembly comprising:
   a seat comprising a seatpan, a seat cushion disposed upon said seatpan and an upwardly extending seatback for supporting an occupant;
   an airbag disposed beneath said seatpan and capable of being inflated from a compacted state to an expanded state to raise at least a portion of said seatpan and said seat cushion upwardly;
   an actuation mechanism for initiating inflation of said airbag in response to a predetermined event such that the occupant's legs are raised upwardly at the knee; and
   a seat belt cinching mechanism for securing the occupant within a seat following the predetermined event, wherein said seat belt cinching mechanism is attached to the portion of said seatpan that is raised such that a seat belt is drawn more tightly about the occupant in response to raising of the portion of the seatpan.

2. A seat assembly according to claim 1 wherein said airbag is proximate a forward portion of said seat cushion.

3. A seat assembly according to claim 1 further comprising a seat frame for support of the seat assembly.

4. A seat assembly according to claim 3 wherein said actuation mechanism is a solid chemical gas generator disposed within said seat frame.

5. A seat assembly according to claim 3 wherein said seatpan is attached to said seat frame at a hinge point such that said seatpan rotates upwardly about a hinge point as a result of inflation of said airbag.

6. A seat assembly comprising:
   a seat comprising a seat cushion defining an opening therethrough and an upwardly extending seatback for supporting an occupant;
   an airbag capable of being inflated from a compacted state to an expanded state, wherein said airbag is disposed below said seat cushion and is inflated upwardly through the opening in said seat cushion so as to expand above said seat cushion and beneath the occupant's knees; and
   an actuation mechanism for initiating inflation of said airbag in response to a predetermined event such that the occupant's legs are raised upwardly at the knee.

7. A seat assembly comprising:
   a seat comprising a seat cushion and an upwardly extending seatback for supporting an occupant;
   a seatpan disposed beneath said seat cushion;
   a gas activated cylinder disposed below said seatpan capable of moving from an unextended state to an extended state such that extension of said gas activated cylinder raises at least a portion of said seat cushion and said seatpan upwardly;
   an actuation mechanism for initiating extension of said gas activated cylinder in response to a predetermined event such that the occupant's legs are raised upwardly at the knee; and
   a seat belt cinching mechanism for securing the occupant within said seat following the predetermined event, wherein said seat belt cinching mechanism is attached to the portion of said seatpan that is raised such that a seat belt is drawn more tightly about the occupant in response to raising of the portion of the seatpan.

8. A seat assembly according to claim 7 further comprising a seat frame for support of said seat assembly.

9. A seat assembly according to claim 8 wherein said actuation mechanism is a solid chemical gas generator disposed within said gas activated cylinder.

10. A seat assembly according to claim 7 wherein said seatpan is attached to said seat frame at a hinge point such that said seatpan rotates upwardly around said hinge point as a result of inflation of said airbag.

11. A method for protecting a seated occupant comprising:
    providing a seat comprising a seatpan, a seat cushion disposed upon the seatpan, an airbag disposed beneath the seatpan and a seat belt cinching mechanism attached to the seatpan;
    detecting a predetermined event;
    inflating the airbag in response to the detection of the predetermined event;
    raising at least a portion of the seatpan and the seat cushion upwardly in response to inflation of the airbag;
    raising the occupant's legs at the knee in response to raising at least a portion of the seatpan and the seat cushion upwardly to thereby limit forward movement of the occupant's upper torso in response to the predetermined event; and
    drawing a seat belt more tightly about the occupant in response to raising at least a portion of the seatpan as a result of the attachment of the seat belt cinching mechanism to the portion of the seatpan that is raised.

12. A method according to claim 11 wherein raising the occupant's legs comprises raising at least a forward portion of the front part of the seat cushion upwardly.

13. A method according to claim 12 further comprising increasing tension on an occupant's seat belt concurrently with raising at least the forward portion of the seat cushion upwardly.

14. A method according to claim 11 wherein detecting the predetermined event comprises detecting rapid deceleration.

* * * * *